(No Model.)
C. C. PARTRIDGE.
REEL.
No. 521,245. Patented June 12, 1894.
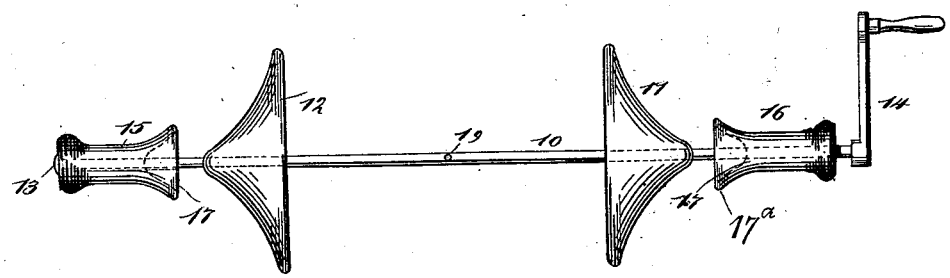
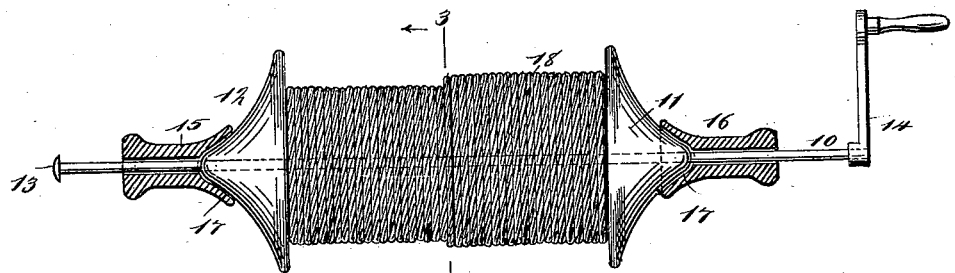
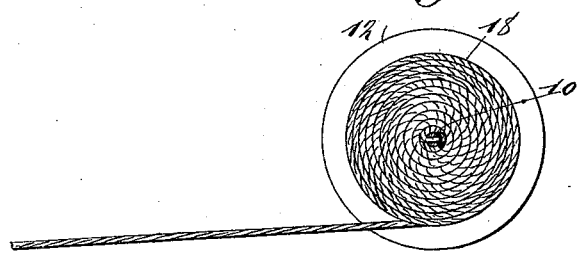
WITNESSES:
F. McArdle
E. M. Clark
INVENTOR
C. C. Partridge
BY Munn & Co
ATTORNEYS.

UNITED STATES PATENT OFFICE.

CHARLES C. PARTRIDGE, OF HYDE PARK, MASSACHUSETTS.

REEL.

SPECIFICATION forming part of Letters Patent No. 521,245, dated June 12, 1894.

Application filed July 25, 1893. Renewed May 7, 1894. Serial No. 510,409. (No model.)

*To all whom it may concern:*

Be it known that I, CHARLES C. PARTRIDGE, of Hyde Park, in the county of Norfolk and State of Massachusetts, have invented a new and Improved Reel, of which the following is a full, clear, and exact description.

My invention relates to an improved reel, and it has for its object to provide a reel adapted especially as a string holder for use in flying kites for example, or for use as a reel for fishing purposes.

The object of the invention is to provide a reel of simple, durable and economic construction, so constructed that cord, or its equivalent, may be expeditiously wound upon the reel without danger of becoming tangled, and whereby the cord may be unreeled as readily and as rapidly as may be desired, and whereby further the brakes may be readily and conveniently applied to regulate the speed at which the cord shall unwind, or to entirely stop its unwinding. The device is also equally applicable to use as a check brake for all kinds of machinery and for vehicles, for instance, bicycles.

The invention consists in the novel construction and combination of the several parts, as will be hereinafter fully set forth and pointed out in the claims.

Reference is to be had to the accompanying drawings, forming a part of this specification, in which similar figures of reference indicate corresponding parts in all the views.

Figure 1 is a side elevation of the reel empty. Fig. 2 is a side elevation, partly in section, of the reel containing cord and illustrating the application of the brake; and Fig. 3 is a transverse section taken practically on the line 3—3 of Fig. 2.

The reel proper consists of a rod 10 and two disks 11 and 12 secured upon the rod in any suitable or approved manner at a predetermined interval apart. Preferably the disks are located equi-distant from the center of the rod, and the outer or back faces of the disks are of conical shape as is best shown in Figs. 1 and 2. The rod 10, extends beyond the outer face of each disk, being provided at one end with a head 13 and at the opposite end with a crank 14. Between the head and the disk 12 a handle 15, is loosely mounted upon the rod, while a similar handle 16, is held to slide on the rod between the crank 14 and the disk 11. The inner end of each handle is preferably enlarged and provided with a conical recess 17, the enlarged inner end 17$^a$, forming substantially a flange which enables the person holding the handles to get a better purchase and to more conveniently and effectively press the handles inward against the disks. The disks form guards and effectively prevent the cord from getting caught between the disks and sleeves.

The cord 18 to be wound upon the reel is secured in any approved manner to the rod 10 between the disks; usually the cord is passed through an aperture 19 made in the center of the rod. By grasping one of the handles, 15, and turning the crank 14 the cord may be wound expeditiously and conveniently as well as evenly upon the rod between the disks; and if, for example, the cord is used in flying a kite, or for fishing purposes, the cord may be made to unwind freely and rapidly by grasping the handles 15 and 16, and carrying them out of engagement with the disks; and the unwinding of the cord may be rendered very slow, or it may be stopped altogether, according to the degree of pressure brought to bear upon the disks by the handles, since the recesses in the handles are adapted to receive the apexes of the disks.

This device is exceedingly simple, durable and economic, and it is capable of application wherever a reel can be used.

Having thus described my invention, I claim as new and desire to secure by Letters Patent—

1. As a new article of manufacture, the herein described reel, consisting of a rod, spaced disks thereon, the rod extending beyond each end of the disks and loose sleeves thereon movable longitudinally into contact with the disks and forming brakes for the reel, the disks forming guards serving to prevent the cord wound on the reel from interfering with the sleeves, substantially as described.

2. As a new article of manufacture, the herein described reel, consisting of a rod having spaced disks, and handles consisting of loose sleeves on the rod outside of the disks, said sleeves having a longitudinal movement on the rod to form brakes, the sleeves having enlarged inner ends forming flanges thereon, substantially as described.

CHARLES C. PARTRIDGE.

Witnesses:
GEORGE C. CHAPMAN,
EDWIN C. JENNEY.